Feb. 13, 1951 F. E. JOHNSON 2,541,966
SNAP FASTENER SOCKET MEMBER
Filed Dec. 18, 1946
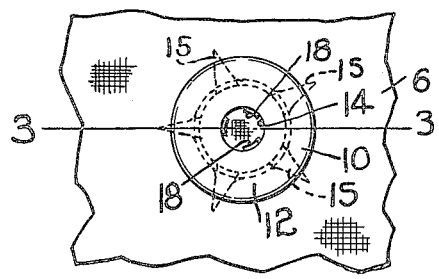
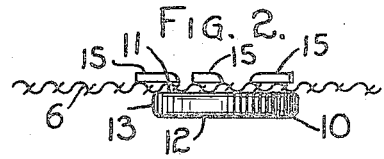
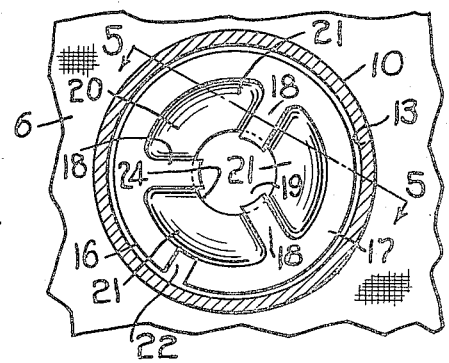
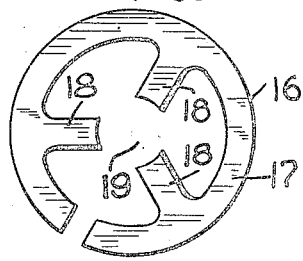
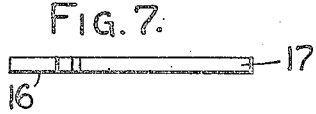
Inventor
FRANK E. JOHNSON,
By John Todd
Attorney Patented Feb. 13, 1951

2,541,966

UNITED STATES PATENT OFFICE 2,541,966

SNAP FASTENER SOCKET MEMBER

Frank E. Johnson, Malden, Mass., assignor to United-Carr Fastener Corporation, Cambridge, Mass., a corporation of Massachusetts Application December 18, 1946, Serial No. 717,004

3 Claims. (Cl. 24—216)

1

The present invention relates to snap fastener members and more particularly to a new and improved socket member and aims generally to improve such socket members for use in snap fastener installations.

The invention has for one of its primary aims and objects the provision of an improved socket member for snap fastener installations, especially installations of the laundry-proof type, which will be simple in construction and durable in use, by providing a strong, relatively flat socket member, highly resistant to distortion by compression, as for example, by the rolls of laundry wringer or ironing machinery.

Other objects and advantages of the invention will be apparent to those skilled in the art to which the invention relates, from a consideration of the accompanying drawings and annexed specification, illustrating and describing some preferred embodiments of the invention.

In the drawings:

Fig. 1 is a bottom plan view of an improved laundry-proof socket member applied to a supporting or carrying member, according to one form of the invention;

Fig. 2 is a side elevation of the socket and member shown in Fig. 1;

Fig. 3 is an enlarged central vertical sectional view thereof as taken on the line 3—3 of Fig. 1;

Fig. 4 is a horizontal sectional view through the socket member as taken on the line 4—4 of Fig. 3;

Fig. 5 is a detail transverse sectional view as taken on the line 5—5 of Fig. 4;

Fig. 6 is a plan view of the stud-engaging spring;

Fig. 7 is an edge elevation of the stud-engaging spring;

Fig. 8 is a plan view of the spacing member of the socket part;

Fig. 9 is an edge elevation of the spacing member of the socket part; and

Fig. 10 is a detail sectional view illustrating an alternative manner of attaching the socket member to its support.

Referring to the drawings, the improved fastener socket of the invention, as illustrated, is preferably of the type designed for snap fastener engagement with a stud member attached to a part 1, which may of fabric, flexible sheeting, leather or other suitable material. The stud member preferably includes a support-engaging plate 2 having an outwardly displaced enlarged head 3 and reduced neck 4 and is adapted to be attached to the support 1 by an eyelet member

2

5 disposed on the opposite side of the support as is customary. Any suitable construction of stud and manner of attaching it to a support may be employed.

The fastener socket member of the present invention is adapted to be attached to a separate support or part 6 of fabric, leather, flexible sheeting or the like and is adapted for snap fastening engagement with the stud.

The improved socket member comprises a casing 10 of suitable sheet material, such as sheet metal or sheet plastic composition, and is preferably of considerably greater width or diameter than depth. The socket therefor comprises a base portion 11 or support-engaging face or wall and a spaced stud-receiving face or wall 12, connected by a side wall 13. The outer stud-receiving wall 12 is centrally apertured at 14 to receive the entering stud head 4 and neck 3.

Mounted within the casing 10 is a stud-engaging spring 16 which preferably is a flat spring and comprises a resilient, split annulus 17 and a plurality of inwardly extending radial stud-engaging fingers 18. The fingers terminate short of the center of the annulus so as to provide a stud-receiving opening 19 therebetween, the diameter of which is approximately equal to the diameter of the stud neck 4 and less than the diameter of the stud head 3. The spring is preferably positioned in the casing 10 adjacent the stud-enging wall 12 with the openings 14 and 19 in registry. The ends of the spring fingers 18 thus form a restricted expansible stud-gripping member.

The casing walls 11 and 12 are supported against collapse or distortion by compression as by wringer or mangle rolls, by means of a spacing member 20 having bearing engagement with both walls and providing guide means for the stud-engaging fingers 18.

Preferably the spacing member 20 is in the form of a circular disc having a plurality of spaced sector-shaped embossments 21 disposed inwardly of the outer peripheral edge of the disc and terminating short of the center thereof as shown in Fig. 8. The member 20 thus provides an annular bearing surface 22 for the spring annulus 17 and radial bearing portions 23 for the radial fingers 18, as well as rigid support for the spaced casing walls 11—12. If desired, the member 20 may be formed with a central opening or aperture 24 to permit the passage of the nose end 4 of the stud therethrough.

From the above it will be seen that the spring 16 provides an expansible stud-engaging member mounted adjacent the casing wall 12 and operative to engage the neck portion 3 of the stud and hold the stud and socket parts firmly together.

The socket member 10 may be attached to its supporting part 1 in any suitable manner. According to one embodiment of the invention, as shown in Figs. 2 and 3, the outer support-engaging wall 11 of the casing 10 may be provided with an annular series of attaching prongs 15 adapted to penetrate the support 1 and be clinched over the opposite face to secure the socket members thereto. Alternatively, the inwardly extending support-engaging wall 11 may encompass the flanged base 25 of an eyelet 26, the eyelet having a flange 27 engaging the opposite face of the support as shown in Fig. 10.

While I have illustrated and described a preferred construction embodying my invention, I do not intend to be limited thereby, as the scope of the invention is best defined by the appended claims.

I claim:

1. A socket fastener member adapted for snap fastening locking engagement with a cooperating stud comprising a casing having opposed spaced walls, one of which is formed with a stud-receiving aperture, an expansible member within said casing and having radially disposed stud-engaging portions extending toward said aperture, and a supporting member disposed within said casing having a portion in engagement with one of said walls and other portions extending between said radially disposed stud-engaging portions and engaging the other of said walls for maintaining a predetermined spacing between the walls of said casing.

2. A socket fastener member adapted for snap fastening locking engagement with a cooperating stud comprising a casing having opposed spaced walls one of which is formed with a stud-receiving aperture, a split expansible annulus within said casing and having sliding bearing engagement with said apertured casing wall, radially disposed stud-engaging means connected to said annulus and extending toward said aperture, and supporting means having a portion overlying said annulus in engagement with the other of said spaced walls and other portions of greater depth disposed between said radially disposed stud-engaging means in engagement with said apertured casing wall for maintaining a predetermined spacing between said casing walls.

3. A socket fastener member adapted for snap fastening locking engagement with a cooperating stud comprising a casing having opposed spaced walls one of which is formed with a stud-receiving aperture, a split expansible annulus within said casing and having sliding bearing engagement with said apertured casing wall, radially disposed stud-engaging fingers connected to said annulus and extending toward said aperture, and a spacing disc within said casing having a flat rim bearing against said annulus and embossments disposed between said radially disposed stud-engaging fingers providing portions in engagement with said opposed spaced walls for maintaining a predetermined spacing between said casing walls.

FRANK E. JOHNSON.

REFERENCES CITED

The following references are of record in the file of this patent:

UNITED STATES PATENTS

| Number | Name | Date |
|---|---|---|
| 1,274,787 | Rowe | Aug. 6, 1918 |
| 1,292,574 | Bourque | Jan. 28, 1919 |
| 1,341,043 | Carr | May 25, 1920 |